United States Patent [19]

Yahara et al.

[11] Patent Number: 4,748,359

[45] Date of Patent: May 31, 1988

[54] PERMANENT MAGNET ROTOR WITH SINUSOIDAL FLUX PATTERN

[75] Inventors: Masataka Yahara; Goro Urayama, both of Chiba; Yoshiomi Joujima, Funabashi; Hiroshi Sugai, Sakura, all of Japan

[73] Assignee: Hitachi, Ltd., Tokyo, Japan

[21] Appl. No.: 870,945

[22] Filed: Jun. 5, 1986

[51] Int. Cl.[4] .............................................. H02K 91/14
[52] U.S. Cl. ....................................... 310/156; 310/261
[58] Field of Search ................... 310/40 MM, 46, 111, 310/156, 152, 261

[56] References Cited

U.S. PATENT DOCUMENTS

| | | | |
|---|---|---|---|
| 4,591,749 | 5/1986 | Gauthier et al. | 310/156 |
| 4,617,726 | 10/1986 | Denk | 310/156 |
| 4,625,135 | 11/1986 | Kasabian | 310/261 |

FOREIGN PATENT DOCUMENTS

| | | | |
|---|---|---|---|
| 1942855 | 8/1973 | Fed. Rep. of Germany | 310/156 |
| 55-53164 | 4/1980 | Japan | 310/156 |

*Primary Examiner*—Patrick R. Salce
*Assistant Examiner*—D. L. Rebsch
*Attorney, Agent, or Firm*—Antonelli, Terry & Wands

[57] ABSTRACT

A permanent magnet rotor wherein a rotary shaft has an orthogonal cross a sectional shape orthogonal in a longitudinal direction of the rotary shaft, a plurality of circular-arc portions which are around the axis of rotation of the rotary shaft, and rectilinear portions which connect the adjacent circular-arc portions with straight lines having no curved portion. Respective permanent magnets, equal in number to the circular-arc portions, are fixed extending over the circular-arc portions and the rectilinear portions. The surface of each permanent magnet remote from the rotary shaft has a cross sectional contour orthogonal to the longitudinal direction of the rotary shaft, forming a circular arc which protrudes outward.

6 Claims, 4 Drawing Sheets

STATOR MAGNETOMOTIVE FORCE

ROTOR MAGNETIC FLUX

→ DIRECTION OF ROTATION

PERMANENT MAGNET ROTOR WITH SINUSOIDAL FLUX PATTERN

BACKGROUND OF THE INVENTION

1. Field of the Invention:

The present invention relates to a rotor which has a plurality of permanent magnets on the peripheral surface of a rotary shaft.

2. Description of the Prior Art:

A rotor having permanent magnets has been proposed in Japanese Patent Laid Open-Application No. 58-123355, wherein a rotary shaft is provided which has an orthogonal cross-sectional shape in a longitudinal direction thereof, and a plurality of circular-arc portions which center around an axis of rotation of the rotor shaft, as well as rectilinear portions which respectively connect adjacent circular arc portions with straight lines having no curved portion. A plurality of permanent magnets, equal in number to the circular-arc portions are respectively fixed in opposition only to the rectlinear portions.

In, for example, Japanese Utility Model Registration Application Laid-Open No. 55-120283, a rotor of the aforementioned construction is proposed which is easier to manufacture and which prevents the permanent magnets from turning relative to the axis of rotation against torques which act on the magnets.

SUMMARY OF THE INVENTION

The present invention has for its object to further improve the rotor disclosed in the aforementioned official gazette of Japanese Patent Application Laid-open No. 58-123355 and to provide a rotor which can increase output per unit volume.

In the present invention, a rotary shaft is provided which has an orthogonal cross-sectional shape in a longitudinal direction thereof, with a plurality of circular-arc portions which center around a rotary axis of the rotary shaft, and rectilinear portions which connect adjacent circular-arc portions with straight lines having no curved portion. Respective permanent magnets equal in number to the circular-arc portions are fixed in close contact or at uniform intervals while extending over the circular-arc portions and the rectilinear portions. In addition, the surface of each of the permanent magnets remote from the rotary shaft includes a sectional contour orthogonal to the longitudinal direction of the rotary shaft, forming a circular arc which juts out. These features are effective to enable a manufacturing of a rotor which exhibits improved magnetic characteristics and which is structurally immune to torque reactions acting on the permanent magnets.

DESCRIPTION OF THE PREFERRED EMBODIMENTS

Figure 1:
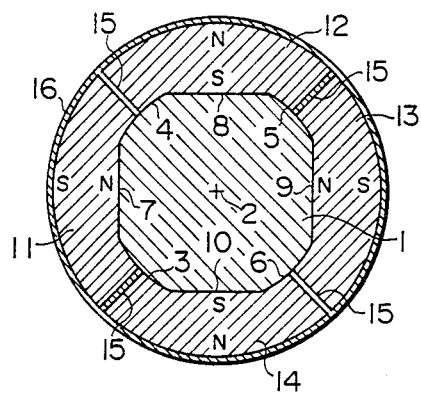
FIG. 1 is a cross-sectional view of an embodiment of a permanent magnet rotor according to the present invention.

Referring now to the drawings wherein like reference numerals are used throughout the various views to designate like parts and, more particularly, to FIG. 1, according to this figure, a rotary shaft 1 includes an axis of rotation 2 and has an orthogonal cross-sectional contour in a longitudinal direction thereof. The rotary shaft 1 includes circular arc-portions 3–6 which are equal in number to the poles and which are centered around the axis of rotation 2. Rectilinear portions 7–10 are provided for connecting the adjacent circular-arc portions 3 and 4, 4 and 5, 5 and 6, and 6 and 3, respectively, with straight lines having no curved portion.

Permanent magnets 11–14 are disposed in the same number as that of the poles, and each permanent magnet 11–14 is fixed to two of the circular-arc portions and the rectilinear portion between these two circular-arc portions in close contact or at a uniform interval.

By way of example, the permanent magnet 11 is fixed to the two circular-arc portions 3, 4 and the rectilinear protion 7 between them by the use of an adhesive, not shown, while the permanent magnet 12 is fixed to the two circular-arc portions 4, 5 and the rectilinear portion 8 between them by the use of adhesive, not shown.

The permanent magnets 11 and 13 are so magnetized that their outer peripheral surfaces exhibit S-poles, and the permanent magnets 12 and 14 are so magnetized that their outer peripheral surfaces exhibit N-poles.

The adjacent permanent magnets 11 and 12, 12 and 13, 13 and 14, and 14 and 11 are bonded, desirably through members of a nonmagnetic material 15.

The center of a circle formed by the outer peripheries of the permanent magnets 11–14 lies on the axis 2.

A binder 16 is wound around a cylinder formed by the outer peripheries of the permanent magnets 11–14.

Centrifugal forces acting on the permanent magnets 11–14 are countered with the binder 16 and the adhesive interposed between the rotary shaft 1 and the respective permanent magnets 11–14, and torque reactions are parried with the rectilinear portions 7-10 of the rotary shaft 1.

According to this embodiment, a magnetic flux distribution results, based on the permanent magnets 11-14, which approximates a sinusoidal wave. It is well known as to rotary electric machines that magnetic flux distribution close to the sinuosoidal wave is desirable when the enhancement of a precise control or the reduction of noise or vibrations is intended.

A magnetic flux density to be established by the permanent magnets 11-14 is determined by the properties of materials and the operating point of a magnetic circuit including the permanent magnets. The operating point is given as the intersection point between a demagnetization curve and a straight line whose gradient is a permeance coefficient. The permeance coefficient $P_g$ is determined in accordance with the following relationship:

by $P_g = L_m/A_m \times A_8/L_8$, wherein:

$L_m$ = a thickness of the magnet,
$A_m$ = an area of the magnet,
$A_g$ = a gap area, and
$L_g$ = a gap length between an armature core 17 and an outer peripheral surface of each of the permanent magnets 11-14.

With magnets having the shape illustrated in FIG. 1, the permeance coefficient becomes large in a middle portion having a great thickness $L_M$ and small in the end portion of a relatively small thickness $L_M'$.

Figure 2:
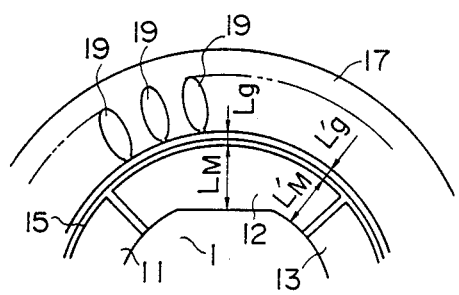
FIG. 2 is a diagram showing the symbols of dimensions in a rotary electric machine which comprises the rotor shown in FIG. 1.
Figure 3:
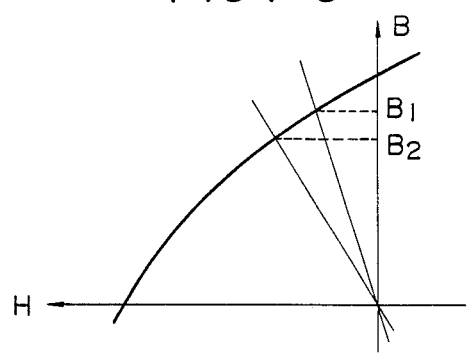
FIG. 3 is a diagram of a B-H curve which is used for explaining the merit of the rotor shown in FIG. 1.
Figure 4:
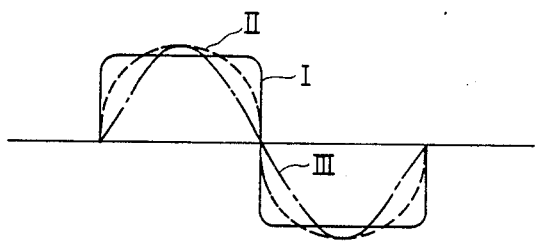
FIG. 4 is a diagram showing the magnetomotive force waveforms of the rotors shown in FIGS. 1 and 5 and a prior-art rotor.

Concerning a magnetic flux density at the operating point, the flux density $B_1$ of the middle portion becomes higher than that of $B_2$ at the end part as shown most clearly in FIG. 3. The magnet flux wave form which is established by a magnet of uniform thickness becomes rectangular with somewhat rounded shoulders as shown at I in FIG. 4 because some flux leaks at the end parts of the pole. In contrast, when the middle portion is made thicker as in the present embodiment, a magnetic flux wave form having a high middle portion, indicated at II in FIG. 4, is obtained due to the difference of the permeance coefficients described hereinabove. A broken line II is nearer to a sinusoidal wave than the solid line I. That is, according to the present embodiment, the ratio of fundamental wave/total effective value is great, so that a rotary electric machine of high magnetic flux utilization factor and good controllability can be fabricated. A horizontal axis H in FIG. 3 indicates the electromotive force, and numeral 19 in FIG. 2 indicates an armature slot.

Figure 5:
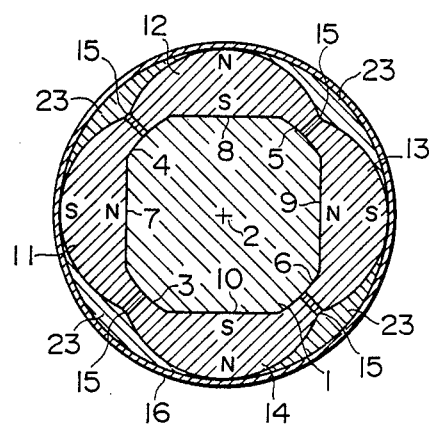
FIG. 5 is a cross-sectional view of another embodiment of a permanent magnet rotor according to the present invention.

An embodiment in FIG. 5 is an example wherein the difference of the thicknesses is more enlarged, to bring the magnetic flux waveform still closer to the sinusoidal wave as shown at III in FIG. 4.

In the embodiment of FIG. 5, the center of the circular arc of the outer peripheral surface of the each of permanent magnets 11-14 deviates toward tbhe side of the permanent magnet with respect to the axis rotation 2 of a rotary shaft 1. Numeral 23 designates a compound, and numeral 16 a binder.

Since a demagnetization yield strength is proportional to the thickness of a magnet, the former is enhanced by increasing the latter.

Figure 6:
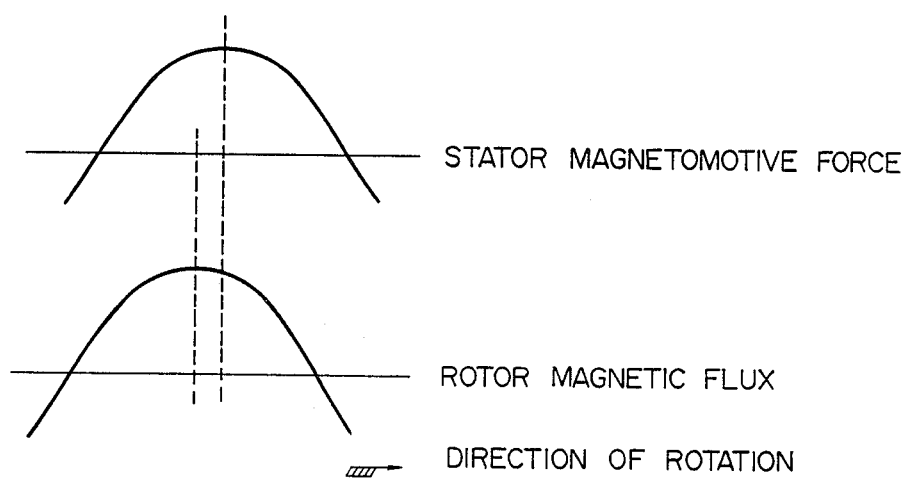
FIG. 6 is a diagram of a magnetomotive force waveform demonstrated when the machine shown in FIG. 2 is operated as a synchronous machine.
Figure 7:
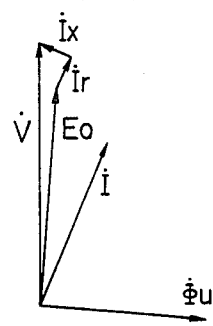
FIG. 7 is a vector diagram in the case where the rotor of the present invention is operated as a synchronous machine.

In a case where a permanent-magnet rotary electric machine is operated as a synchronous motor, the magnetic field of a rotar revolves with a slight lag over the revolving magnetic field of a stator as illustrated in FIG. 6. A vector diagram in this case is shown in FIG. 7, wherein $\Phi_u$ denotes rotor magnetic flux, I armature current, r armature resistance, X synchronous reactance, $E_0$ induced voltage, and V supply voltage. Accordingly, a demagnetizing field in this operation arises in a deceleration mode in which a torque opposite to the direction of rotation is produced, and it becomes great near the middle of a pole and small at the end part thereof. When, in consideration of this phenomenon, the permanent magnet is so shaped as to be thick at the middle part of the ple and thin at the end parts, a high demagnetization yield strength can be attained without increasing the volume considerably.

Figure 8:
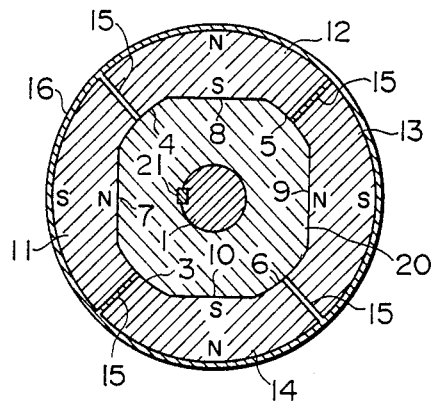
FIG. 8 is a cross-sectional view of yet another embodiment of a permanent magnet rotor constructed in accordance with the present invention.
Figure 9:
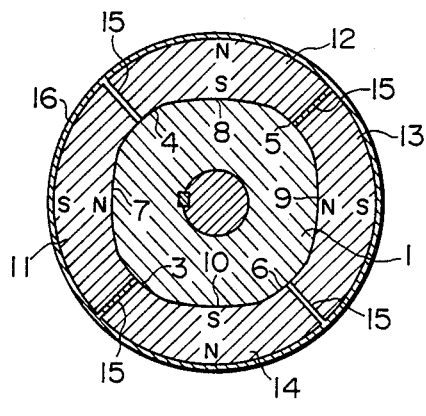
FIG. 9 is a cross-sectional view of another permanent magnet rotor having two sets of curved surfaces.

FIG. 8 shows an example wherein a rotary shaft 1 is prevented from turning by a key 21, and wherein the outer surface of a snugly-fitted boss 20 is provided with circular-arc portions 3-6 and rectilinear portions 7-10. FIG. 9 shows an example wherein small-diameter circular-arc portions indicated at numerals 3-6 are connected by gentle curve portions 7-10 which are gentler in curvature than the small-diameter circular-arc portions.

Figure 10:
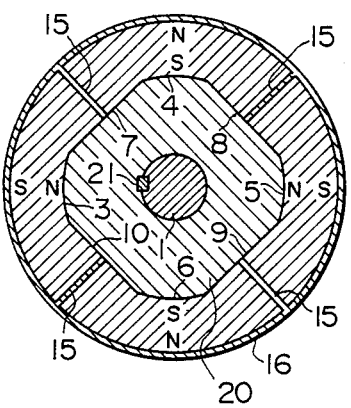
FIG. 10 is a cross-sectional view of an embodiment similar to the rotor of FIG. 8.
Figure 11:
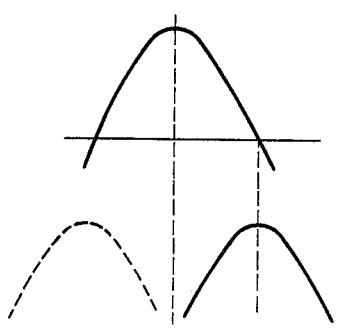
FIG. 11 is a diagram of a magnetomotive force waveform demonstrated when the rotor shown in FIG. 10 is operated as a D.C. machine.
Figure 12:
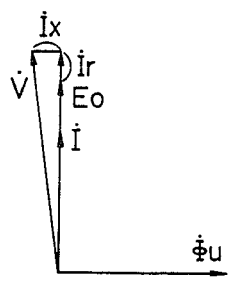
FIG. 12 is a vector diagram in the case where the rotor shown in FIG. 10 is operated as the D.C. machine.
Figure 13:
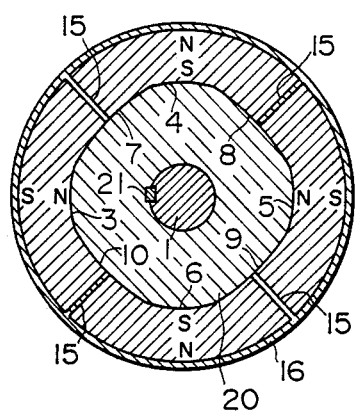
FIG. 13 is a still further embodiment of a permanent magnet rotor constructed in accordance with the present invention.
Figure 14:
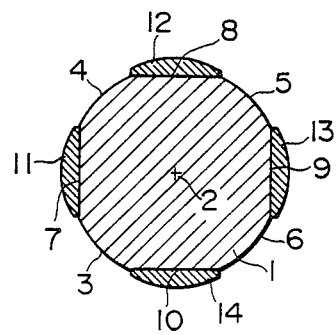
FIG. 14 is a sectional view showing a known rotor.

An example in FIG. 10 is advantageous when a permanent-magnet rotary electric machine is rotated in the mode of a D.C. machine, namely, as a no-commutator motor. A vector diagram in the case of the D.C. machine is shown in FIG. 12. In the mode of the D.C. machine, the magnetic field of a stator is controlled so as to shift by 90° in terms of an electrical angle from the magnetic field of a rotor as illustrated in FIG. 11. Therefore, a demagnetizing field becomes great at the ends parts of a pole and small at the middle part thereof contrariwise to the mode of the synchronous motor described before. Accordingly, when the magnet is so shaped that the end parts of the pole are thicker as shown in FIG. 10, a structure which is efficient as to the demagnetization yield strength is obtained. In this embodiment, each of the permanent magnets 11-14 is fixed to two rectilinear portions and a circular-arc portion located between them. FIG. 13 shows an example wherein small-diameter circular-arc portions indicated at numerals 3-6 are connected by gentle curve portions 7-10 which are gentler in curvature than the small-diameter circular-arc portions.

What is claimed is:

1. A permanent magnet rotor including a rotary shaft means having an orthogonal cross-sectional shape in a longitudinal direction thereof comprising a plurality of circular-arc portions centered around an axis of rotation of said rotary shaft means, rectilinear portions for connecting adjacent circular-arc portions with straight lines having no curved portion, permanent magnets equal in number to said circular-arc portions fixed so as to extend over said circular-arc portions and said rectilinear portions in close contact therewith or at uniform intervals therefrom, an outer surface of each of said permanent magnets remote from said rotary shaft means having a cylindrical shape in a longitudinal direction of the rotary shaft means an inner surface of said permanent magnets adjacent to said rotary shaft means having a rectilinear portion and two circular-arc portions extending from a rectilinear portion, and wherein each of said permanent magnets is fixed to two of said circular-arc portions and one of said rectilinear portions located between the two circular-arc portions.

2. A permanent magnet rotor including a rotary shaft means having an orthogonal cross-sectional shape in a longitudinal direction thereof comprising a plurality of circular-arc portions centered around an axis of rotation of said rotary shaft means, rectilinear portions for connecting adjacent circular-arc portions with straight lines having no curved portion, permanent magnets equal in number to said circular-arc portions fixed so as to extend over said circular-arc portions and said rectilinear portions in close contact therewith or at uniform intervals therefrom, in outer surface of each of said permanent magnets remote from said rotary shaft means having a cylindrical shape in a longitudinal direction of said rotary shaft means, and an inner surface of said permanent magnets adjacent to said rotary shaft means having a circular arc portion and two rectilinear portions extending from the circular-arc portions, and wherein each of said permanent magnets is fixed to two of said rectilinear portions and one of said circular-arc portions located between the two rectilinear portions.

3. A permanent magnet rotor comprising mounting surfaces of permanent magnets shaped so as to have a plurality of small diameter circular-arc portions centered around an axis of rotation of a rotary shaft, gentle curve portions located between adjacent small-diameter circular-arc portions and being gentler in curvature than said small-diameter circular-arc portions, respective permanent magnets equal in number to said small-diameter circular-arc portions being fixed so as to extend over said small-diameter circular-arc portions and said gentle portions in close contact therewith or at uniform intervals, an inner surface of said permanent magnets adjacent to said rotary shaft means having a gentle curve portion and two small-diameter circular-arc portions extending from the gentle curve portion, and an outer surface of each of said permanent magnets remote from said rotary shaft having a sectional shape orthogonal to the axis of rotation of said rotary shaft in the form of an outwardly projecting circular arc.

4. A permanent magnet rotor comprising a rotary shaft means having a cross-sectional shape orthogonal to a longitudinal direction thereof including a plurality of outwardly projecting circular-arc portions and rectilinear portions for connecting the adjacent circular-arc portions with straight lines having no curved portion, respective permanent magnets equal in number to said circular-arc portions being fixed so as to extend over said circular-arc portions and said rectilinear portions in close contact therewith or at uniform intervals therefrom, and an outer surface of each of said permanent magnets remote from said rotary shaft means having a cylindrical shape in a longitudinal direction of said rotary shaft means, and wherein an inner surface of said permanent magnets adjacent to said rotary shaft means having a rectilinear portion and two circular-arc portions extending from the rectilinear portion.

5. A permanent magnet rotor comprising a rotary shaft means having an orthogonal cross-sectional shape in a longitudinal direction thereof including a plurality of circular-arc portions centered around an axis of rotation of said rotary shaft means and rectilinear portions for connecting the adjacent circular-arc portions with straight lines having no curved portion, respective permanent magnets equal in number to said circular-arc portions are fixed so as to extend over said circular-arc portions and said rectilinear portions in close contact therewith or at uniform intervals therefrom, and an outer surface of each of said permanent magnets remote from said rotary shaft means having a sectional shape orthogonal to the longitudinal direction of said rotary shaft means forming a circular arc, a center of which deviates toward said permanent magnet with respect to the axis of rotation of said rotary shaft means.

6. A permanent magnet rotor comprising a boss snugly fitted on a rotary shaft so as to prevent a turning thereof and having a sectional contour orthogonal to a longitudinal direction of said rotary shaft including a plurality of outwardly projecting circular-arc portions and rectilinear portions for connecting adjacent circular-arc portions with straight lines having no curved portion, permanent magnets equal in number to said circular-arc portions being respectively fixed so as to extend over said circular-arc portions and said rectilinear portions in close contact therewith or at uniform intervals therefrom, and an outer surface of each of said permanent magnets having a sectional shape orthogonal to the longitudinal direction of said rotary shaft forming an outwardly projecting circular arc, an inner surface of said permanent magnets adjacent to said rotary shaft means having a rectilinear portion and two circular-arc portions extending from the rectilinear portion.

* * * * *